United States Patent [19]

Scorta

[11] Patent Number: 5,368,222

[45] Date of Patent: Nov. 29, 1994

[54] WAVESOLDERING DEVICE AND PROCEDURE

[75] Inventor: Roberto Scorta, Milan, Italy

[73] Assignee: Italtel Societa Italiana Telecommunicazioni s.p.a., Milan, Italy

[21] Appl. No.: 585,139

[22] PCT Filed: Oct. 28, 1988

[86] PCT No.: PCT/EP88/00989

§ 371 Date: Oct. 5, 1990

§ 102(e) Date: Oct. 5, 1990

[87] PCT Pub. No.: WO89/10230

PCT Pub. Date: Nov. 2, 1989

[30] Foreign Application Priority Data

Apr. 19, 1988 [IT] Italy .................... 20244 A/88

[51] Int. Cl.[5] .................. B23K 1/08; B23K 31/02
[52] U.S. Cl. .................. 228/180.1; 228/260; 228/37; 366/328
[58] Field of Search .............. 228/180.1, 180.21, 260, 228/262, 37, 56.1; 366/287, 255, 277, 328

[56] References Cited

U.S. PATENT DOCUMENTS

| | | | |
|---|---|---|---|
| 1,572,306 | 2/1926 | Northcutt | 366/328 |
| 4,540,114 | 9/1985 | Pachschwöll | 228/37 |
| 4,547,076 | 10/1985 | Maurer | 366/255 |
| 4,684,056 | 8/1987 | Deambrosio | 228/180.1 |

FOREIGN PATENT DOCUMENTS

| | | | |
|---|---|---|---|
| 0159425 | 10/1985 | European Pat. Off. | 228/37 |
| 201158 | 11/1986 | European Pat. Off. | |
| 203623 | 12/1986 | European Pat. Off. | |

*Primary Examiner*—P. Austin Bradley
*Assistant Examiner*—Jeffrey T. Knapp

[57] ABSTRACT

Printed circuit boards are wavesoldered by a method featuring the use of a plurality of elementary jets of molten solder to form a single flat soldering wave. Such a single flat wave is achieved by revolving those jets in an orbital motion such that the orbital motion is in a horizontal plane substantially parallel to the printed circuit board. Such a method allows the removal of air/gas bubbles during wavesoldering from any side of a component that is attached to a printed circuit board.

18 Claims, 6 Drawing Sheets

WAVESOLDERING DEVICE AND PROCEDURE

DESCRIPTION

The present invention relates to a wavesoldering method for printed circuit boards and to a suitable device for its implementation.

As known, wavesoldering methods and devices provide that the printed circuit boards are conveyed towards one or more waves of molten solder (it is usually used a tin/lead solder melted by means of heating) which "bath" the feet (or the rheophores) of the components laying on the boards as well as the bonding areas therefor arranged. Once the solder is cold, the feet are soldered to the surface of the boards.

In the wavesoldering field, the reduction of the scruffs is a very important problem. In fact, scruffs reduce worse the soldering quality and must be removed from time to time, thereby reducing the productivity of the soldering device. The above problem, well known to the skilled artisan has been solved by making the soldering wave as flat as possible and by limiting the height of the jump of the molten solder.

The coming of the surface mounting components (known as "SMD") has caused some technical problems which are known in the relevant art as "dry soldering" or as "solder skips". The method and the device according to the present invention are hereinafter described referring to the soldering of SMD units by means of a single wave device, but it can be successfully used for the soldering of any components by means of either a single wave or a double wave device.

The surface mounting units are characterized in that the feet are so shaped as to allow the soldering on the same face of the printed circuit where the components are placed.

The phenomenon known as "dry soldering" occurs when air and/or gas bubbles are trapped between two contiguous components, i.e. near to a component, and inhibit the molten solder from bathing the feet and the bonding areas, even if the component is touched by the wave for a long period of time.

The European Patent Application No. 159.425 describes a plurality of solutions for the problem specified above. The solutions provide molten solder wave progressing in an alternative movement which is oblique in relation to the direction of the printed circuit.

The progressive transverse direction of the molten solder wave allows the removal of air or gas bubbles, by partly reducing the soldering failures due to dry soldering, but raises the scruff formation speed, thereby reducing the productivity of the soldering device.

The transverse movement of the molten solder wave is positive to the extent of the removal of the air/gas bubbles present on two of the component's sides (front and rear side in relation to the progressing direction of the component/printed circuit); however, air/gas bubbles remain on the other sides of the component.

The European Patent Application No. 203623 shows a first solution to the above soldering problems providing that the flat soldering wave, pointed obliquely with respect to the front sides of the components, has an alternative or an orbital movement, which allows the removal of air/gas bubbles from any of the component's sides only if the components are mounted sufficiently far from each other. No increment of scruffs has been evidenced. If the components are mounted too close to each other, the soldering wave could not go in the bottom of the gaps between two adjacent components, removing all the air/gas bubbles.

It is understood that, at least in the present description, orbital movements means a periodic, circular or elliptic movement made by a rigid body (as, for example, the body 15 of FIG. 4) due to the rotation of one or more cams or to the movements of corresponding mechanical devices.

The present invention refers to a soldering method and to a soldering device suitable to remove the air/gas bubbles from any of the component's sides, even if the components are mounted on the printed circuit very near one another, thereby avoiding soldering failures due to "dry soldering" and improving the previous soldering methods and devices known, for example, EP-A-203623.

Object of the present invention is therefore a method for wavesoldering where the printed circuits and components are "bathed" by a molten solder wave. According to the present invention the soldering wave is formed by a plurality of molten solder jets, not substantially protruding from the wave surface, each of which has an orbital movement. According to an alternative embodiment, a first portion of the wave is constituted by molten solder jets, not substantially protruding from the wave surface, each of which has an orbital movement, while the remaining portion of the wave is of traditional type. Another object of the present invention is a device for wavesoldering of printed circuit boards of the type which comprises suitable means to produce a molten solder wave which "baths" the printed circuit boards and the components there on. The present invention provides the presence of splitting means, located into the soldering wave and suitable to divide the wave into a plurality of molten solder jets, each of which has an orbital movement.

According to a preferred embodiment of the present invention the orbital movement of the molten solder jets can be obtained by joining (directly or through coupling means) to a first and a second cam a body which can be crossed by the molten solder jets in vertical direction.

When at least one of the cams rotates, the body joined to it performs an orbital movement which on its turn set the molten solder jets crossing it in a horizontal orbital movement.

As the direction of the horizontal movement cyclically varies between 0 and 360 degrees, the air/gas bubbles are removed.

Figure 1:
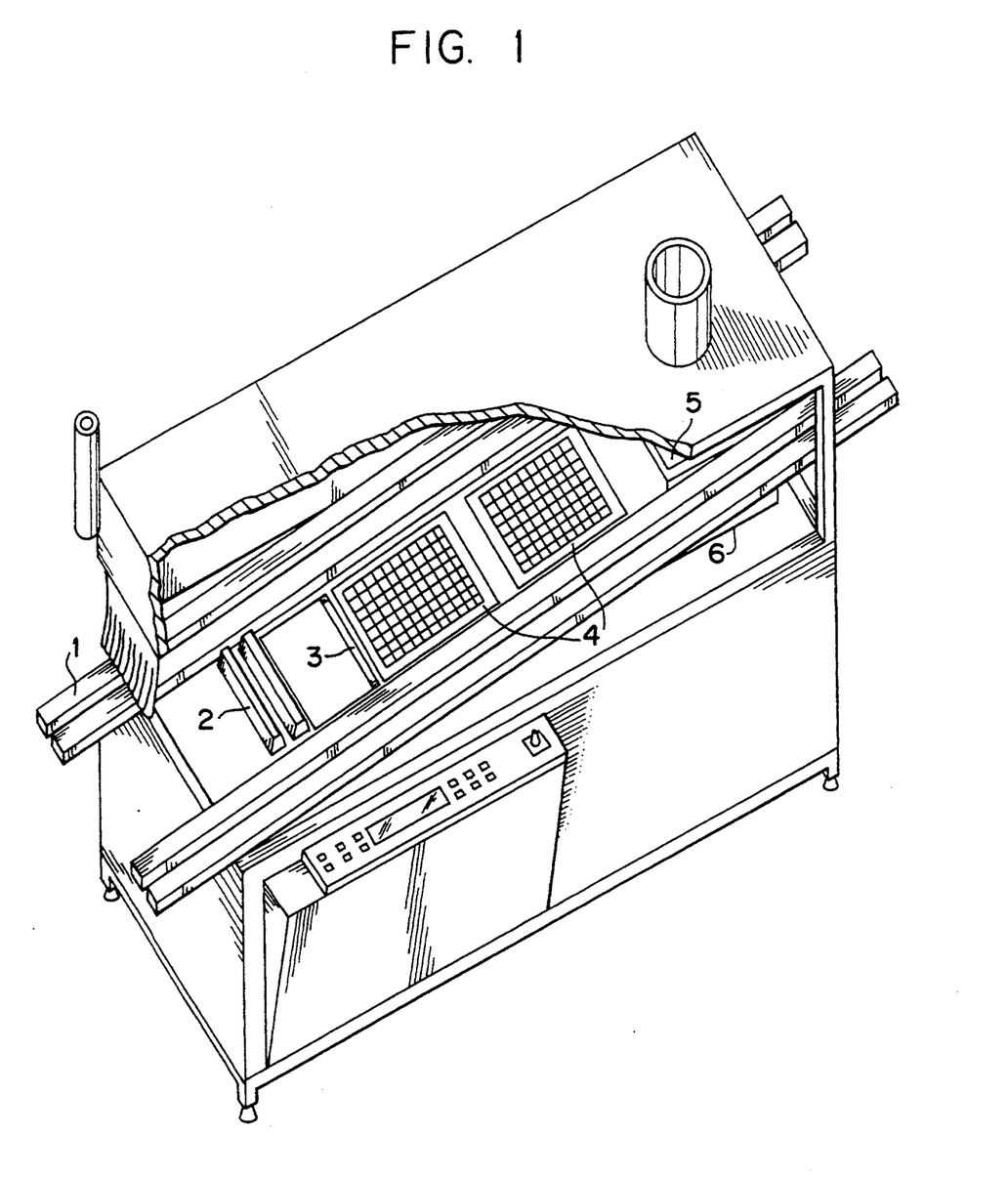
FIG. 1 schematically shows a device for the wavesoldering according to the present invention.

Further characteristics of the present invention can be taken from the below description which refers to a non-limiting example shown in the enclosed drawings in which:

FIG. 1 shows a wavesoldering device so shaped as to comprise:

- a transport unit 1, suitable to drive the printed circuit boards, where the components to be soldered are mounted, towards the functional units hereinafter listed and performing a defined process;
- a flux unit 2, suitable to spray deoxidizing fluids (known as flux oils) in order to eliminate the oxide from the parts which are part of the soldering process and to improve the "wettability";
- a drying unit 3, suitable to eliminate the diluent contained in the fuxing oils deposited on the printed circuit boards;
- a preheating unit 4, suitable to increase the temperature of the printed circuit boards up to an optimal value to the extent of the performance of the soldering process;
- a soldering unit 5, suitable to produce one or more soldering waves which baths the printed circuit boards causing the soldering of the components.

The unit of FIG. 1 has been cited as a non-limiting example, as the method according to the present invention can be applied to any wavesoldering unit (table- or bench type), using in total or partially the functional units mentioned above.

Figure 2A:
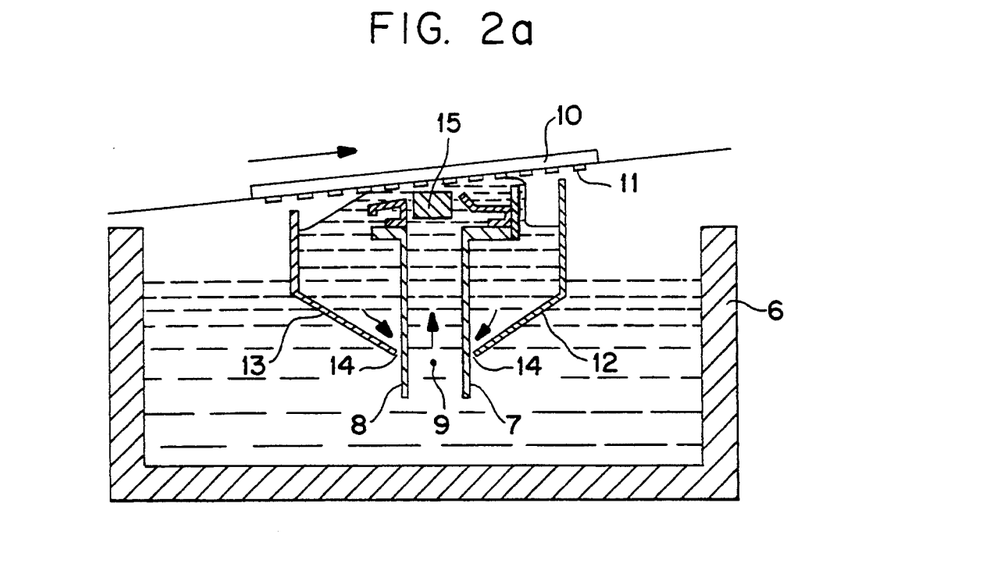
FIG. 2a and 2b shows in details the wavesoldering device 5 of FIG 1 in order to illustrate the procedure according to the present invention.

FIG. 2a illustrates a section of the soldering unit 5, perpendicular to the main axis of the wave produced, in order to point out the travel path along which the molten solder moves following the operation of pumping means, (not illustrated as the components are well known).

Figure 2B:
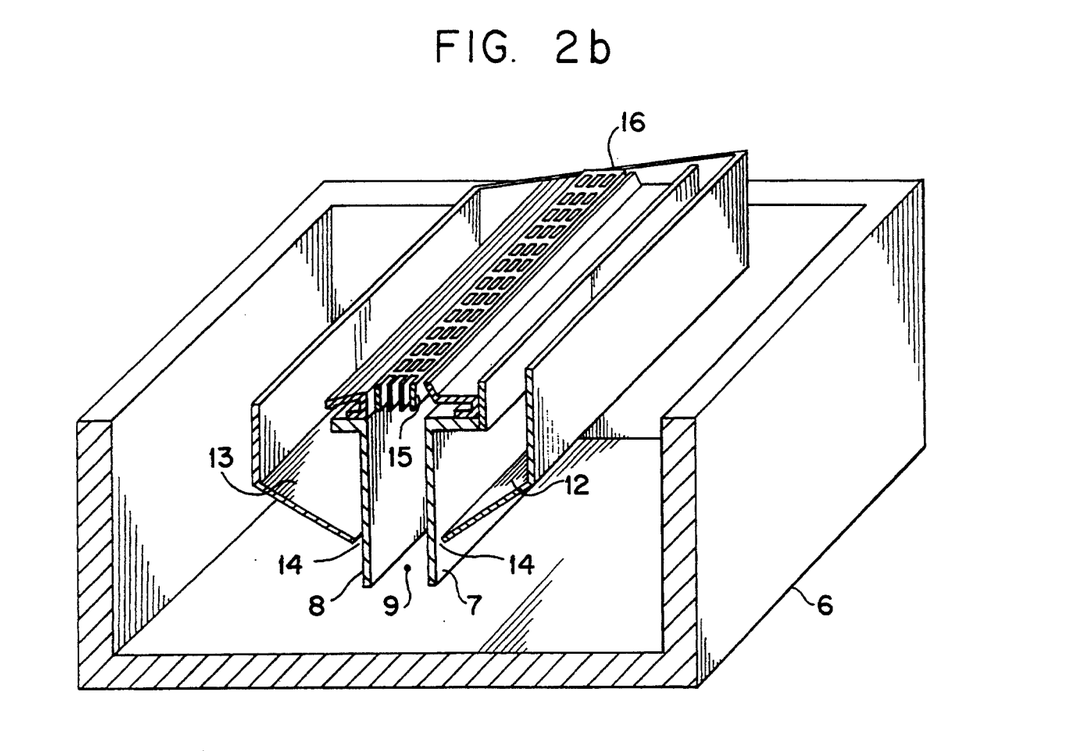

FIG. 2b shows an axonometry of the soldering unit 5 without the molten solder, in order to evidence the configuration of the elements which compose it.

FIGS. 2a and 2b show that a couple of walls 7 and 8 are located inside the well 6 and delimit a duct 9 through which the solder, in a fluid state, flows operated by the pumping means. The pumping means forces the molten solder along the duct 9 and it comes out from the upper opening, creating in this way a wave towards which the printed circuit boards 10, with components 11, are conveyed.

In order to limit the distance that the molten solder fails back to well 6 (and to contain the scruffs due to the solder oxidation), a further pair of walls 12 and 13 are placed next to the external side of the walls 7 and 8 which delimit the duct 9.

The walls 12 and 13 are so shaped as to contain the molten solder and to allow a gradual transfer into the well 6 through an opening 14 provided between the lower end of the walls 12 and 13 and the external sides of walls 7 and 8.

FIGS. 2a and 2b illustrate the soldering procedure, which is purpose of the present invention. According to this procedure the soldering wave is formed by a plurality of molten solder jets having an orbital movement.

The jets may be obtained by placing a body 15, provided with a plurality of openings 16, against the upper nozzle of duct 9 and giving body 15 an orbital movement. Openings 16 on body 15 cause the wave division into a plurality of jets: when body 15 makes an orbital movement, the same movement is transmitted to the molten solder jets which surround the components mounted on the printed boards, removing the air/gas bubbles from any side of the component.

From the same FIG. 2 it is possible to note that body 15 has a width slightly inferior to the opening of duct 9, thus allowing to have a wave completely formed by molten solder jets, each of which has an orbital movement. According to the present invention, it is even possible to enlarge the opening of the duct in order to have a wave with a portion formed according to the present invention (i.e. formed by molten solder jets having an orbital movement), while the remaining portion is of traditional type.

Figure 3A:
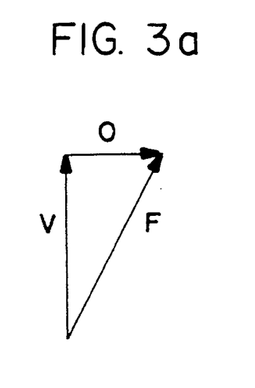
FIG. 3a, b and c illustrates the diagrams of the forces which act on the molten solder jets according to the present invention.

FIG. 3a shows a diagram of the forces which operate upon the molten solder flowing through the openings 16. In particular, it is possible to note that each of the molten solder jets has a vertical movement component V (caused by the pumping means) and a horizontal movement component 0 (produced by the walls of the openings 16 when body 15 has an orbital movement).

Figure 3B:
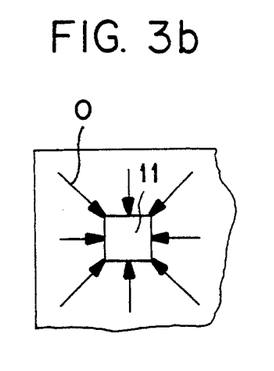
Figure 3C:
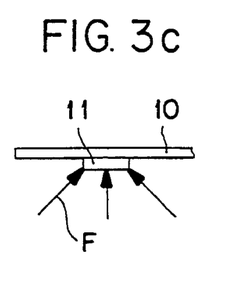

The direction of the horizontal component cyclically varies between 0° and 360°, as shown in FIG. 3b. With the component force F if reached, which impresses a thrust to the air/gas bubbles near one of the common components 11 progressing in a direction cyclically variable as shown in FIG. 3c.

It results that the air/gas bubbles are removed from any position.

FIG. 4 schematically shows a first embodiment of the soldering unit 5, implemented according to the present invention. In said FIG. 4, as well in FIGS. 5 and 6, the walls 12 and 13 are not illustrated. On the other hand, the transport means provided for the orbital movement of body 15 are illustrated in detail: said means are associated to well 6 and include a motor 17 suitable to cause the rotation of the corresponding shaft 18, which is joined through transmission means (such as belt), to a second shaft 19, on which a gear 20 is mounted.

Gear 20 is joined to a first cam 21 which is supported by a bracket 22 and swings around its corresponding axis.

Figure 4A:
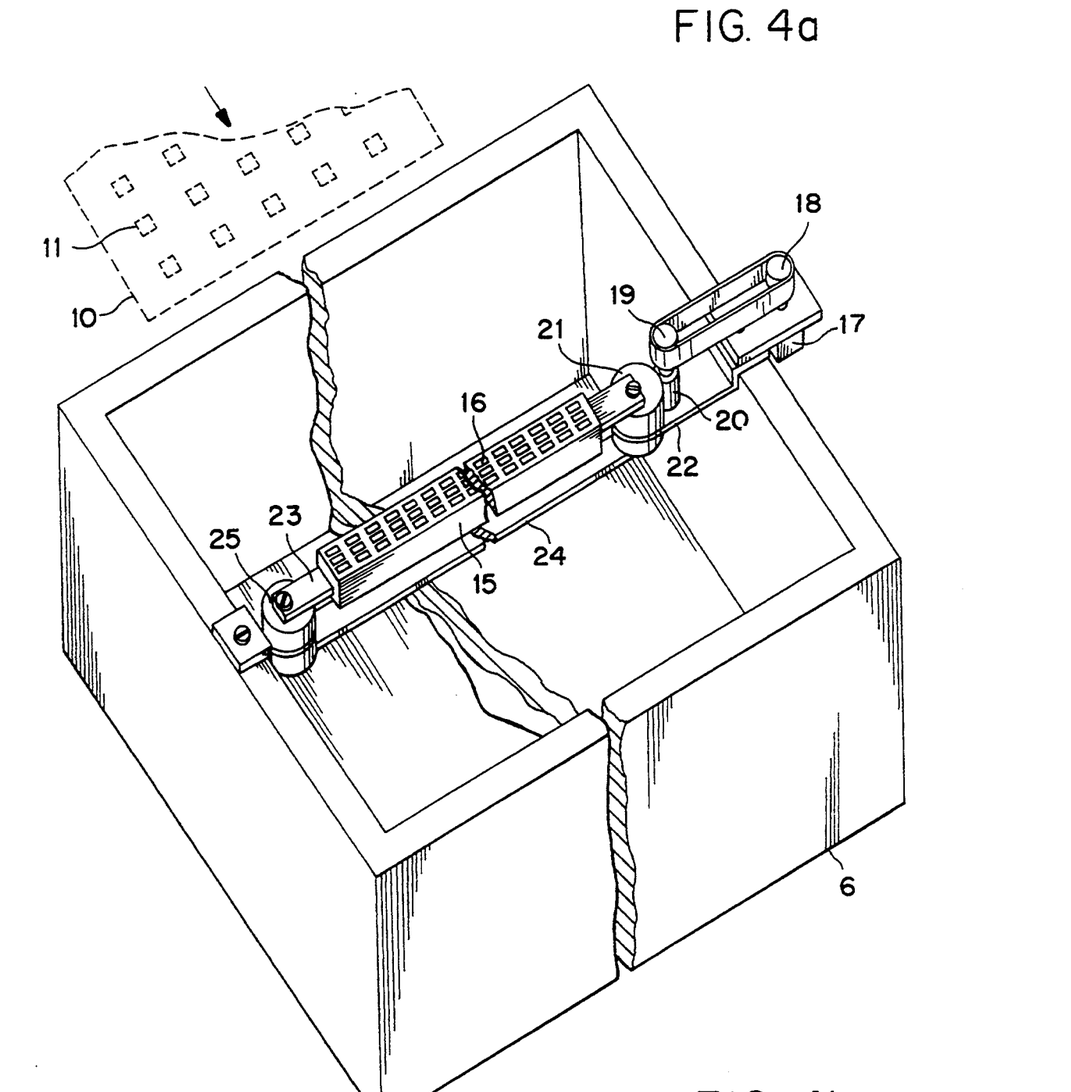
FIG. 4a and 4b is a view schematically showing a first example of the wavesoldering device 5 of FIG. 1, implemented according to the present invention.
Figure 4B:
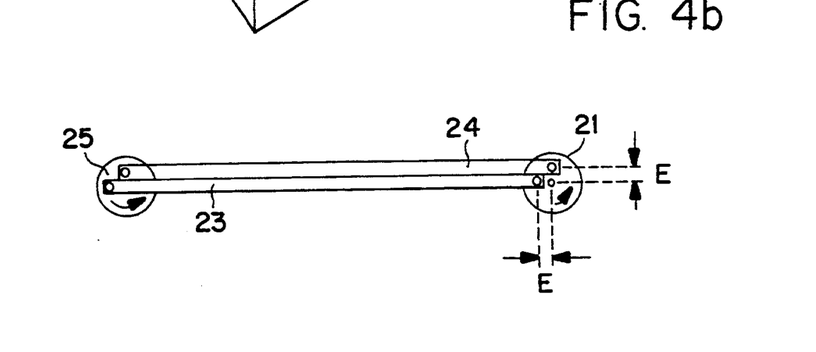

On the upper side, respectively on the lower side, of the first cam 21, a first connecting rod 23 is mounted, respectively a second rod 24, staggered among themselves of 90° as better and schematically shown in FIG. 4b. Connecting rods 23 and 24 are joined to a second cam 25, which swings around its axis dragged by the first cam 21, by means of connecting rods 23 and 24.

The eccentricity E of the first and second cam 21 and 25 is equal to a predetermined value which corresponds to about 2.5 mm.

The first connecting rod 23 supports the body 15 provided by a plurality of openings 16, while the second connecting rod 24 must assure the rotation of the second cam 25 even if the first connecting rod 23 should stop near its dead center. As the first and second connecting rod are staggered among themselves of 90°, if the cams should stop according to the position of FIG. 4b (the first rod 23 is near its dead center), the rotation of the cam 25 is assured by a second rod 24 which—in the position—works under the maximum mating condition.

When motor 17 causes the rotation of cam 21 and 25, body 15 moves according to a direction having a variable amplitude according to the eccentricity E value. The molten solder jets, coming out from the openings 16, progress in a plurality of orbits which move around single components 11, mounted on printed board 10. According to the present invention and to the embodiment of FIG. 4, as well as to the embodiments of FIGS. 5 and 6, it is possible to use a single cam and/or means suitable to cause an orbital movement.

Figure 5:
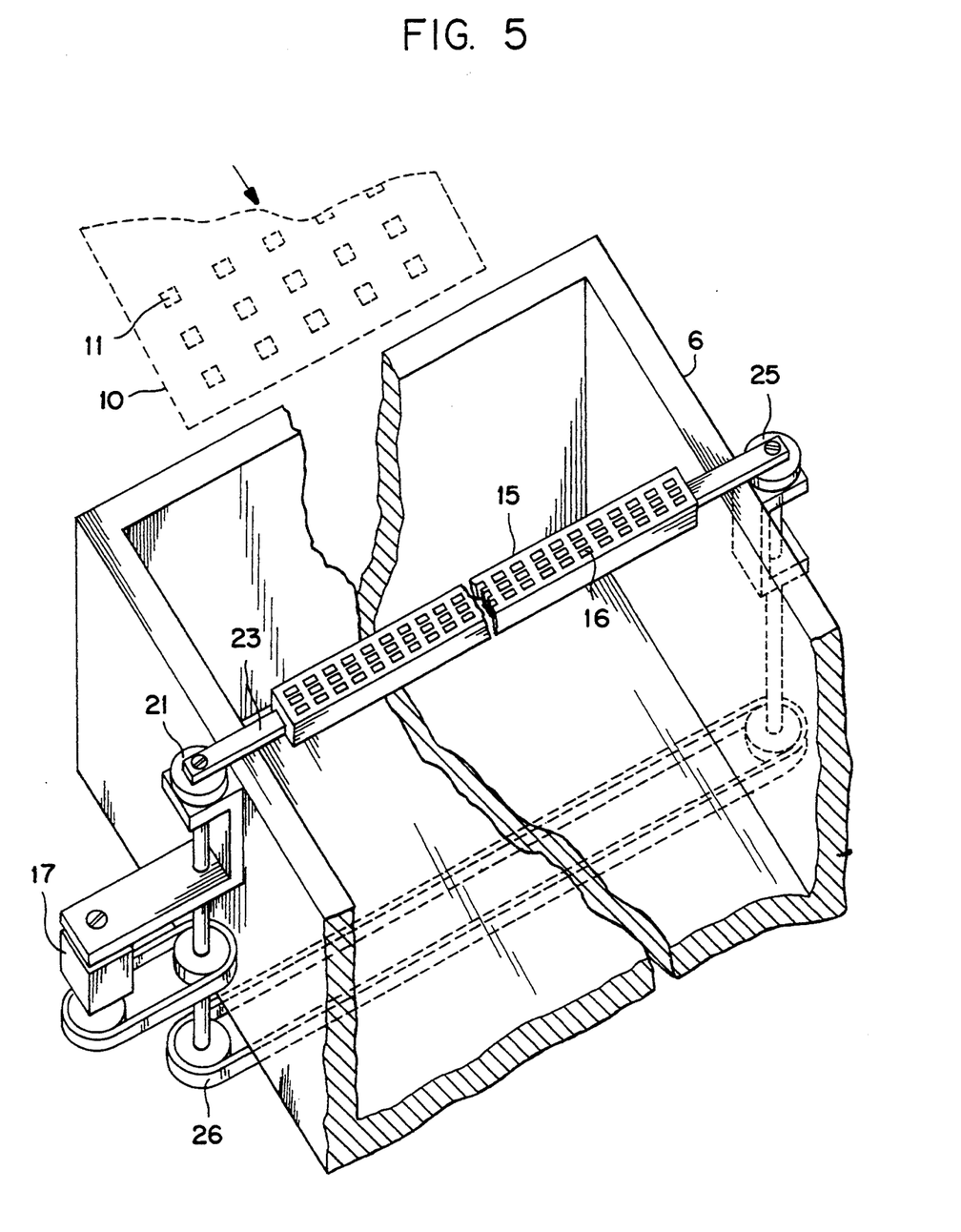
FIG. 5 is a view schematically showing a second example of a wavesoldering device 5 of FIG. 1, according to the present invention.

FIG. 5 shows a second embodiment of the unit implemented according to the present invention, where the transport means, unlike the unit in FIG. 4, are located outside well 6.

More in particularly it is possible to see two cams which operate as cams 21 and 25 of FIG. 4a and are therefore marked with the same numbers. The rotation of the cams is caused by a motor 17 through one or two belts 26: at least one of the belts—crossing well 6—operates either on cam 21 or on cam 25 through a relevant shaft. The connecting rod 23 which supports body 15 provided with opening 16 is joined to the cams 21 and 25.

The second connecting rod 24 is therefore non-essential, as the second cam 25 is directly operated by motor 17 and the problems mentioned above, for the embodiment where the second cam 25 is drived by the first cam 21, do not occur.

Even in this case the rotation of motor 17 causes the movement in orbital direction of body 15, which causes the same movement to the molten solder jets coming out from openings 16. The jets determine the removal of gas bubbles near components 11.

Figure 6:
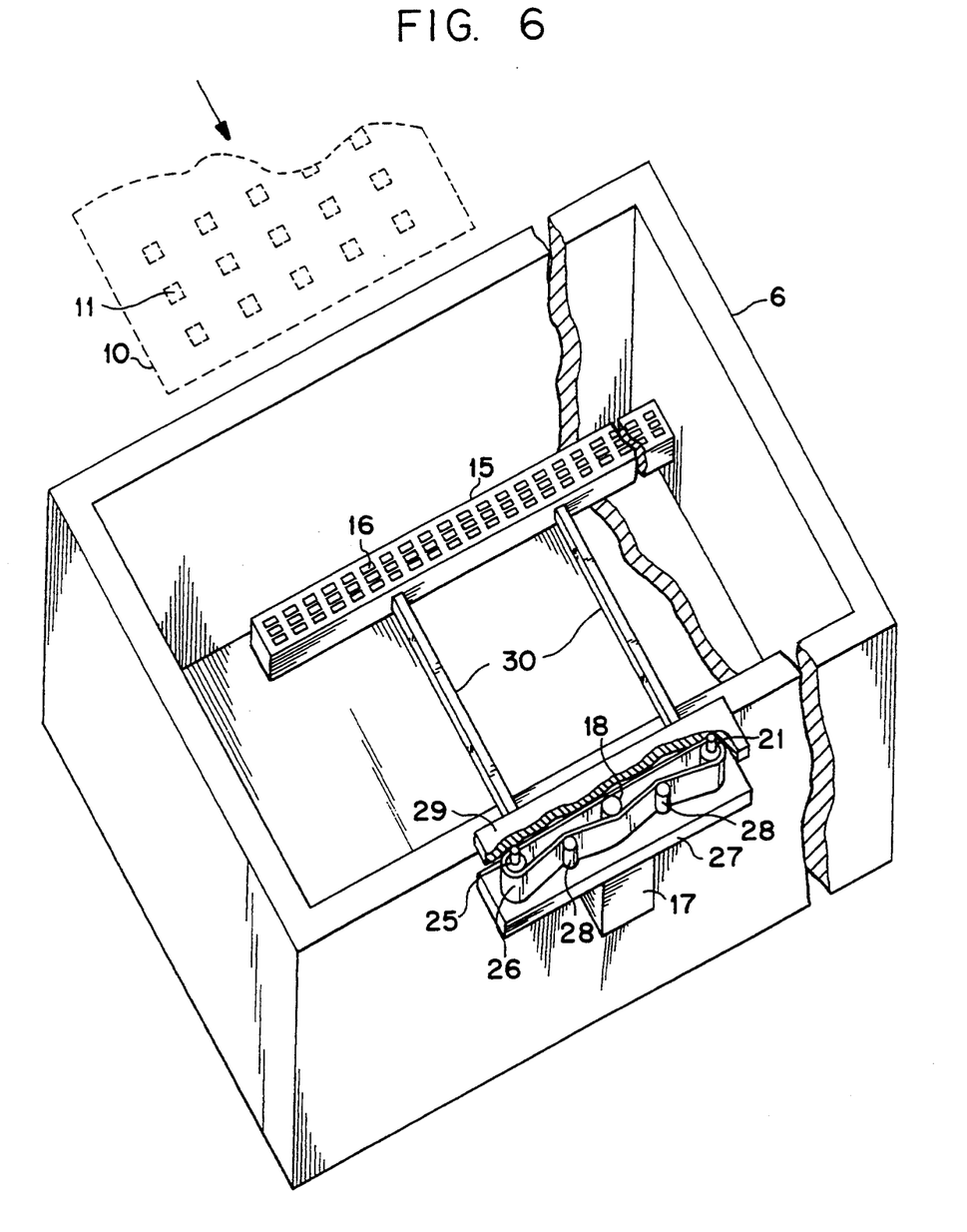
FIG. 6 schematically shows a third embodiment of the wavesoldering unit 5 of FIG. 1, according to the present invention.

FIG. 6 shows a third embodiment of a wavesoldering unit according to the present invention, where the transport means are placed on the rear surface of well 6 in relation to the feed direction of printed circuits 10. It is noted that motor 17 is supported by a bracket 27, placed on the rear side of the well, and the corresponding cam causes the rotation of a shaft 18 which drives a belt 26. This latter is stretched by a couple of pins 28 (having the function to increase the working angle of the shaft 18 on belt 26) and causes the rotation of two cams 21 and 25, to which a longitudinal body 29 is connected. Body 15 is anchored to the body by means of one or more arms 30.

When motor 17 is operated, a rotation of cams 21 and 25 is registered, which causes the orbital movement of the longitudinal body 29. This latter, by means of arms 30, transfers the orbital movement to body 15 provided with openings 16, which on its turn causes the same movement of the molten solder jets which come out from openings 16.

Figure 7:
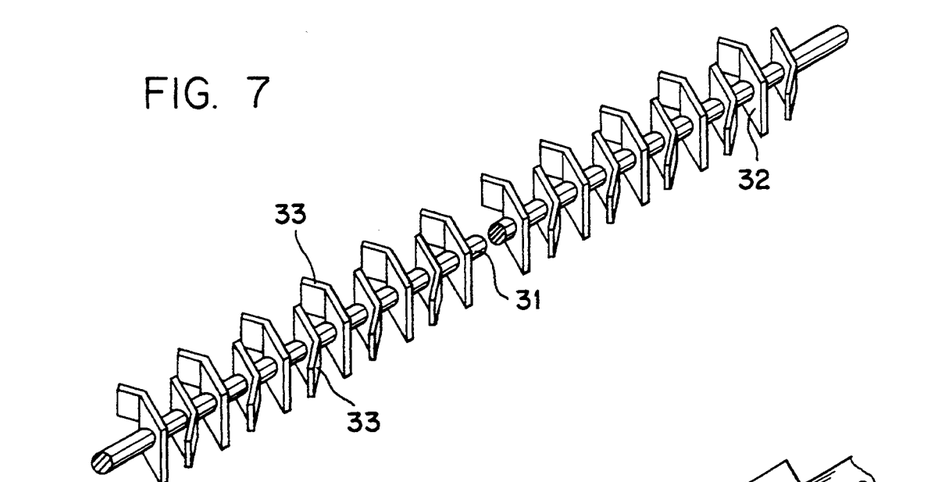
FIG. 7 illustrates a second example of a body 15 of FIGS. 2, 4, 5 and 6.

FIG. 7 shows a second embodiment of body 15 where, unlike the previous embodiment, it is implemented by assembling, by means of an arm 31, a plurality of plates 32 having the edge perpendicular to the surface of the printed circuit boards, provided with tongues 33, bended according to a predetermined angle. According to a preferred embodiment the tongues have a bending of 60° about and are alternatively placed with the bending towards right side or left side.

When the body moves forward, tongues 33 drives the molten solder jets in spiral direction, which is formed by a combination among the orbital movement of the body, the vertical movement caused by the pumping means and the lateral one caused by the tongues. Using therefore the body of FIG. 7, a further movement comes up, caused by the bending of tongues 33.

Figure 8:
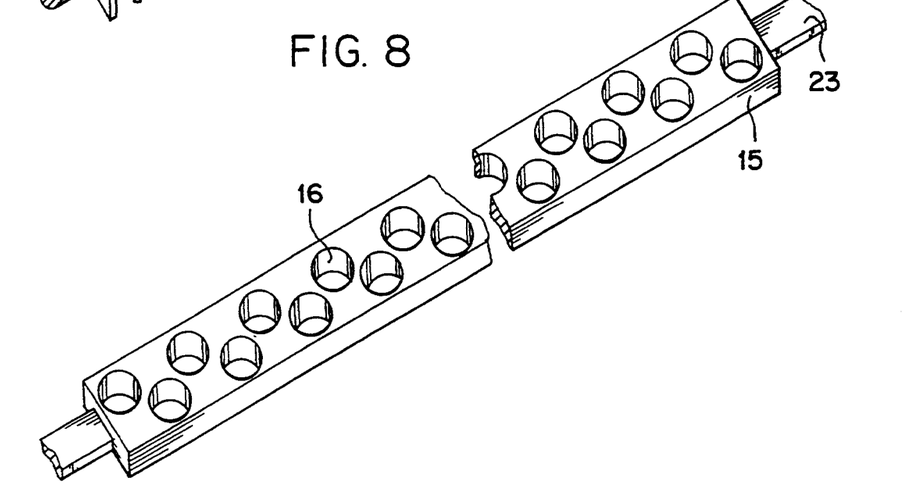
FIG. 8 illustrates a third example of body 15 of FIGS. 2, 4, 5 and 6.

FIG. 8 shows a further implementation of body 15 formed by a plate on which a plurality of circular holes 16 are made.

When a body 15, implemented according to FIG. 8, is used, the force diagrams illustrated in FIG. 3 are very accurate and the horizontal vector 0 of FIG. 3b and 3c has the same value on each direction. Naturally the length of the vectors slightly differs among themselves making use of a body 15 having the openings 16 a square or rectangular shape.

In order to adapt procedure and device to the different type of components to be soldered, the present invention provides for the adjustment of the speed of rotation of motor 17 (and consequently the revolving speed of the molten solder jets) as well as of the orbit amplitude of the solder jets. This latter parameter may be modified adjusting the value of the eccentricity E of the cams 21 and 25 by screw means.

The embodiments described above provide for circular orbit. According to the present invention it is therefore possible to move body 15 in an ellictic movement (instead of a circular one) allowing to get results comparable with the ones of a circular movement.

According to what stated above it is clear that the procedure and the device implemented according to the present invention meet the requirements of the present invention, as they cause the removal of air/gas bubbles from any position and the elimination of soldering failures due to dry soldering.

I claim:

1. A method for wavesoldering units, such as printed circuit boards by bathing the printed circuit board with a molten soldering wave, comprising the steps of:
   (a) forming a single flat soldering wave;
   (b) forming a plurality of elementary jets of molten solder within the flat soldering wave, the jets substantially not protruding from a flat surface of the flat soldering wave;
   (c) revolving the elementary jets in an orbital motion such that the orbital motion forms a horizontal plane substantially parallel to the printed circuit board; and
   (d) bathing the printed circuit board with the flat soldering wave having the plurality of elementary jets of molten solder therein.

2. The method as claimed in claim 1 wherein a revolving speed of said step (c) of the molten solder jets is adjustable.

3. The method as claimed in claim 1, wherein an amplitude of the molten solder jets is adjustable.

4. The method as claimed in claim 1, wherein the orbital motion of molten solder jets has a circular form.

5. The method as claimed in claim 1, wherein the orbital motion of the molten solder jets has an elliptic form.

6. A device for wavesoldering a printed circuit board, comprising:
   waves means for producing a flat wave of molten solder inside a well to bath the printed circuit board;
   splitting means, located within said wave means, for dividing a portion of the mass of the soldering wave into a plurality of elementary jets of molten solder such that the printed circuit boards is bathed in a flat wave of molten solder having a plurality of elementary jets of molten solder therein;
   drive means for revolving said splitting means in an orbital motion such that the orbital motion forms a horizontal plane substantially parallel to the printed circuit board;

said splitting means including a body provided with openings which is connected to said drive means;

said drive means including a first and second cam, one of said first and second cams receiving a rotative movement.

7. The device as claimed in claim 6, wherein said first and second cam are placed on a front side and a rear side, respectively, of the well, the connecting rod of said first and second cam is joined to said body provided with openings through a coupler and a motor (17) and a transmission produce the rotative movement of the first cam.

8. The Device as claimed in claim 6, wherein said body provided with openings is grid-shaped, the grid having a predetermined shape and dimension.

9. The device as claimed in claim 6 wherein a revolving speed of the molten solder jets is variable dependent upon a rotation speed of a motor.

10. The device as claimed in claim 6, wherein said first and second cam are placed at sides of the well such that said body is joined thereto and said first cam has a rotative movement caused by a motor through a transmission.

11. The device as claimed in claim 10 or 7 wherein said motor causes the rotative movement of the first and second cam by a belt.

12. The devices as claimed in claim 6, wherein the orbital motion of the molten solder jets is variable dependent upon an eccentricity value of said first and second cam.

13. The device as claimed in claim 12, wherein said eccentricity value is 2.5 mm.

14. The device as claimed in claim 6, wherein said splitting body further includes an arm shaped device which supports a plurality of plates, said plates having edges which are perpendicular to a surface of the printed circuit boards and a tongue bent according to a predetermined angle.

15. The device as claimed in claim 14, wherein said tongue has an height less than a corresponding edge, said predetermined angle is 60°, and said tongue is alternatively present on a left and right side of a corresponding plate.

16. The device as claimed in claim 6, wherein said first and second cam are placed inside the well;

said driving means further including,
a first connecting rod formed in said body provided with openings and joined to said first and second cams, and
a motor which causes the rotative movement of said first cam through a first shaft, a second shaft connected to the first shaft through a transmission and a gear moved by the second shaft so as to move the first cam.

17. The device as claimed in claim 16, wherein said first and second cam, a second connecting rod, staggered with respect to the first connecting rod, are joined at a predetermined angle.

18. The device as claimed in claim 17, wherein said predetermined angle is 90°.

* * * * *